US009651282B2

United States Patent
Ito et al.

(10) Patent No.: US 9,651,282 B2
(45) Date of Patent: May 16, 2017

(54) REFRIGERATION AND AIR-CONDITIONING APPARATUS AND HUMIDITY CONTROL DEVICE

(75) Inventors: Shinichi Ito, Tokyo (JP); Fumitake Unezaki, Tokyo (JP); Mamoru Hamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 299 days.

(21) Appl. No.: 14/349,098

(22) PCT Filed: Oct. 28, 2011

(86) PCT No.: PCT/JP2011/006029
§ 371 (c)(1),
(2), (4) Date: Apr. 2, 2014

(87) PCT Pub. No.: WO2013/061377
PCT Pub. Date: May 2, 2013

(65) Prior Publication Data
US 2014/0230479 A1     Aug. 21, 2014

(51) Int. Cl.
*F25B 30/02*     (2006.01)
*F24F 3/14*     (2006.01)
(Continued)

(52) U.S. Cl.
CPC ............ *F25B 30/02* (2013.01); *F24F 3/1429* (2013.01); *F24F 5/0014* (2013.01);
(Continued)

(58) Field of Classification Search
CPC ...... F24F 3/1411; F24F 3/1429; F24F 12/006; F24F 11/008; F24F 5/0014; F25B 30/02;
(Continued)

(56) References Cited

U.S. PATENT DOCUMENTS

| 2,257,478 A * | 9/1941 | Newton | ............... F24F 3/1417 165/222 |
| 2,700,537 A * | 1/1955 | Pennington | ........... F24F 3/1423 165/222 |

(Continued)

FOREIGN PATENT DOCUMENTS

| CN | 102022794 A | 4/2011 |
| CN | 103237589 A | 8/2013 |

(Continued)

OTHER PUBLICATIONS

Office Action mailed on Mar. 24, 2015 in the corresponding JP application No. 2013-540509 (and English translation).

(Continued)

*Primary Examiner* — Len Tran
*Assistant Examiner* — Kristin Oswald
(74) *Attorney, Agent, or Firm* — Posz Law Group, PLC

(57) ABSTRACT

An air-conditioning system includes a pump that sends, to an evaporator, a cooling fluid that exchanges heat with a refrigerant at the evaporator, and a first heat exchanger that exchanges heat between ambient air and the cooling fluid that has undergone the heat exchange at the evaporator. A sensible heat exchange cycle is formed by annularly connecting the evaporator, the heat exchanger, and the pump by using a pipe. This system is also includes an air-sending unit that sends air to a second heat exchanger, moisture absorbing-and-desorbing devices that are provided at a passage of the air sent by the air-sending unit and that are disposed in front of and behind the first heat exchanger, and an air-path switching device that reverses a passing direction of air passing through the moisture absorbing-and-desorbing device, the first heat exchanger, and the moisture absorbing-and-desorbing device.

6 Claims, 10 Drawing Sheets

(51) Int. Cl.
*F24F 5/00* (2006.01)
*F24F 11/00* (2006.01)
*F24F 12/00* (2006.01)

(52) U.S. Cl.
CPC ........ *F24F 11/0008* (2013.01); *F24F 12/006* (2013.01); *Y02B 30/563* (2013.01)

(58) Field of Classification Search
CPC ...... F25B 2313/0314; F25B 2700/1933; F25B 2700/1931; F25B 2700/02; F25B 2313/0315; F25B 13/00; F25B 2313/02741; F25B 2313/006; F25B 49/02
USPC .......................................................... 62/271
See application file for complete search history.

(56) References Cited

U.S. PATENT DOCUMENTS

| | | | |
|---|---|---|---|
| 3,359,706 A | 12/1967 | Zankey | |
| 4,391,104 A * | 7/1983 | Wendschlag | F24D 5/12 62/238.6 |
| 4,719,761 A | 1/1988 | Cromer | |
| 4,982,575 A * | 1/1991 | Besik | F24F 3/1411 165/4 |
| 5,003,961 A * | 4/1991 | Besik | F24F 3/1411 126/110 R |
| 5,025,638 A * | 6/1991 | Yamagishi | F24F 3/044 236/49.3 |
| 5,230,466 A * | 7/1993 | Moriya | G05D 22/02 236/44 A |
| 5,230,719 A * | 7/1993 | Berner | F24F 3/1411 165/4 |
| 5,564,281 A * | 10/1996 | Calton | F24F 3/1411 62/271 |
| 5,649,428 A * | 7/1997 | Calton | F24F 3/1411 62/94 |
| 6,311,511 B1 | 11/2001 | Maeda | |
| 7,410,533 B2 * | 8/2008 | Yabu | F24F 3/1411 55/506 |
| 7,526,924 B2 * | 5/2009 | Wakamoto | F25B 7/00 62/175 |
| 2004/0177627 A1 * | 9/2004 | Fujimoto | F24F 12/006 62/151 |
| 2005/0257551 A1 * | 11/2005 | Landry | F24F 3/1411 62/271 |
| 2006/0207429 A1 * | 9/2006 | Yabu | F24F 3/1411 96/146 |
| 2006/0218943 A1 * | 10/2006 | Yabu | B01D 53/261 62/94 |
| 2006/0260332 A1 * | 11/2006 | Matsui | B01D 53/06 62/94 |
| 2007/0180844 A1 * | 8/2007 | Fujiyoshi | F24F 3/065 62/271 |
| 2007/0180851 A1 * | 8/2007 | Fujiyoshi | F24F 3/1411 62/480 |
| 2008/0092565 A1 * | 4/2008 | Yabu | F24F 3/06 62/94 |
| 2008/0276640 A1 * | 11/2008 | Bhatti | F24F 3/1423 62/271 |
| 2010/0022177 A1 * | 1/2010 | Hidaka | B60H 1/00478 454/156 |
| 2010/0024106 A1 * | 2/2010 | Katsumi | F24D 5/12 4/213 |
| 2011/0113800 A1 * | 5/2011 | Sekiya | B60H 1/00278 62/151 |

FOREIGN PATENT DOCUMENTS

| | | |
|---|---|---|
| EP | 1752716 A1 | 2/2007 |
| JP | 48-20993 B1 | 6/1973 |
| JP | 11-132506 A | 5/1999 |
| JP | 2001-173992 A | 6/2001 |
| JP | 2002-191971 A | 7/2002 |
| JP | 2005-131544 A | 5/2005 |
| JP | 2005-291587 A | 10/2005 |
| JP | 2006-329601 A | 12/2006 |
| JP | 2007-240128 A | 9/2007 |
| JP | 2007-315694 A | 12/2007 |
| JP | 4513380 B2 | 7/2010 |
| JP | 2010-249485 A | 11/2010 |
| JP | 2011-58676 A | 3/2011 |
| WO | 2010/050001 A1 | 5/2010 |

OTHER PUBLICATIONS

Office Action issued Dec. 7, 2015 in the corresponding CN application No. 201180074461.8 (with English translation).
International Search Report of the International Searching Authority mailed Jan. 31, 2012 for the corresponding international application No. PCT/JP2011/006029 (and English translation).
Extended European Search Report issued Feb. 1, 2016 in the corresponding EP application No. 11874635.3.
Office Action issued May 12, 2016 in the corresponding CN application No. 201180074461.8 (with English translation).

* cited by examiner a) AIR-FLOW-PASSAGE
   SWITCHING TIME  Td b) AIR-FLOW-PASSAGE
   SWITCHING TIME  Td+ΔT Qall : TOTAL HEAT PROCESSING AMOUNT
Qs   : SENSIBLE HEAT PROCESSING AMOUNT
Ql   : HEAT PROCESSING AMOUNT
W    : INPUT input                    output

US 9,651,282 B2

REFRIGERATION AND AIR-CONDITIONING APPARATUS AND HUMIDITY CONTROL DEVICE

CROSS REFERENCE TO RELATED APPLICATION

This application is a U.S. national stage application of PCT/JP2011/006029 filed on Oct. 28, 2011, the contents of which are incorporated herein by reference.

TECHNICAL FIELD

The present invention relates to refrigeration and air-conditioning apparatuses and humidity control devices. In particular, the present invention relates to a refrigeration and air-conditioning apparatus and a humidity control device that supply cooling energy or heating energy toward a load by cooling or heating a liquid medium, such as water or brine.

BACKGROUND

In the conventional technique, a cooling device that supplies cold water is equipped with cooling means, such as a chiller, for obtaining cold water cooled to a desired temperature. Such cooling means is equipped with a compressor, a condenser, pressure-reducing means, and an evaporator, and is provided with a refrigeration cycle that makes a refrigerant circulate therethrough.

A low-pressure low-temperature refrigerant liquid and a cooling fluid containing water as its main component circulate through the evaporator in a heat exchangeable manner. That is, the refrigerant liquid evaporates by receiving heating energy (evaporation heat) from the cooling fluid, whereas the cooling fluid is cooled by surrendering heating energy. In a case where the cooling fluid is used in an air-conditioning apparatus, conditioned air and the cooling fluid exchange heat in an air-conditioned space so as to cool or heat the air-conditioned space.

In a proposed example of a refrigeration and air-conditioning apparatus that performs cooling operation with high efficiency, "a cooling unit includes a condenser that is disposed outdoors and performs cooling using outside air and evaporators provided at positions lower in level than that of the condenser. Moreover, the cooling unit is equipped with refrigeration cycles configured to be switchable between thermo-siphon refrigeration cycle operation and refrigerant compression forced circulation refrigeration cycle operation. In the cooling unit, the refrigeration cycles are arranged in a plurality of stages in parallel with the single condenser. The evaporators of the refrigeration cycles in the plurality of stages are configured such that the evaporating temperature of the evaporator in the first stage is set high, and the evaporating temperatures of the evaporators decrease in turn from the second stage. Cooling load pipes are connected in series with the evaporators in the refrigeration cycles, sequentially from the first stage" (see, for example, Patent Literature 1).

Patent Literature

Patent Literature 1: Japanese Unexamined Patent Application Publication No. 2006-329601 (Abstract, FIG. 1)

With the plural refrigeration cycles configured so that the evaporating temperatures of their evaporators are set so as to decrease sequentially from the first stage, the refrigeration and air-conditioning apparatus proposed in Patent Literature 1 described above performs highly efficient operation. However, the apparatus has the following problems. In the case where the refrigeration and air-conditioning apparatus is configured to generate a cooling fluid with a desired temperature by using plural refrigeration cycles, many refrigeration cycles are necessary. This increases the size of the apparatus, sometimes making it difficult to install devices.

Furthermore, in a case where the air-conditioned subject is to be dehumidified by using cold water, the cooling fluid exchanges heat without a change in phase, thus increasing the temperature of cooled water by the amount of heat exchange, as compared with a direct expansion method (such as a domestic in-room air conditioner). Therefore, in order to ensure the amount of dehumidification, the cold-water temperature needs to be set in view of the amount of increase in temperature. Even if the refrigerant evaporating temperatures are set to sequentially decrease, the evaporating temperatures in relatively low stages are lower than those in the direct expansion method, resulting in reduced efficiency of the refrigeration cycles.

Moreover, in a case where the dew-point temperature of the target air quality is low, the evaporating temperature of the refrigerant is lower than the above case. Thus, when the refrigerant and the cooling fluid exchange heat, freeze protection control may sometimes be necessary.

SUMMARY

The present invention has been made to the solve the above-described problems, and has as its first object to provide a refrigeration and air-conditioning apparatus and a moisture control device that are compact, are highly efficient, and can ensure a comfortable air-conditioned space by ensuring a given amount of dehumidification even in operation where the evaporating temperature of a refrigeration cycle is high. The second object of the present invention is to provide a refrigeration and air-conditioning apparatus and a moisture control device that can readily be controlled in accordance with a target amount of dehumidification and that can avoid freeze protection.

A refrigeration and air-conditioning apparatus according to the present invention includes a compressor that compresses a refrigerant; a condenser that condenses the refrigerant compressed by the compressor; air-sending means that sends air toward the condenser; expansion means that reduces the pressure of the refrigerant condensed by the condenser; and an evaporator that evaporates the refrigerant reduced in pressure by the expansion means. A refrigeration cycle is formed by a refrigerant circuit including the compressor, the condenser, the expansion means, and the evaporator. The refrigeration and air-conditioning apparatus further includes cooling-fluid sending means that sends, to the evaporator, a cooling fluid that exchanges heat with the refrigerant in the evaporator; and a first heat exchanger that exchanges heat between ambient air and the cooling fluid that has undergone heat exchange at the evaporator. A first cooling-fluid circuit is formed by annularly connecting the evaporator, the first heat exchanger, and the cooling-fluid sending means by using a pipe. The refrigeration and air-conditioning apparatus further includes a first air-sending unit that sends air to the first heat exchanger; a first moisture absorbing-and-desorbing device and a second moisture absorbing-and-desorbing device that are provided at a flow passage of the air sent by the first air-sending unit and that are disposed in front of and behind the first heat exchanger; and an air-path switching device that reverses a passing direction of air passing through the first moisture absorbing-and-desorbing device, the first heat exchanger, and the second moisture absorbing-and-desorbing device.

At least one of load-side devices connected to a heat source unit is provided with a moisture absorbing-and-desorbing device and an air-passage switching device, and the dew-point temperature of air flowing into the heat exchanger is increased, so that a humidity control device that can continuously perform dehumidification even when the temperature of the cooling fluid is close to the dew-point temperature of conditioned air can be achieved, thereby allowing for highly efficient dehumidification in the refrigeration and air-conditioning apparatus. Furthermore, by varying the switching cycle of the air-passage switching device in the humidity control device, the amount of dehumidification becomes controllable in a state where the temperature of the cooling fluid is stable. Moreover, when multiple indoor units are to be connected, the humidity control device is disposed on the upstream side of the flow passage of the cooling fluid, and the cooling-fluid temperature or the amount of air in the humidity control device is controlled such that the temperature of cooling fluid exhausted from the humidity control device becomes close to the indoor dew-point temperature or a preset value, whereby a location where dew water is produced can be restricted to a specific humidity control device.

DETAILED DESCRIPTION

Figure 1:
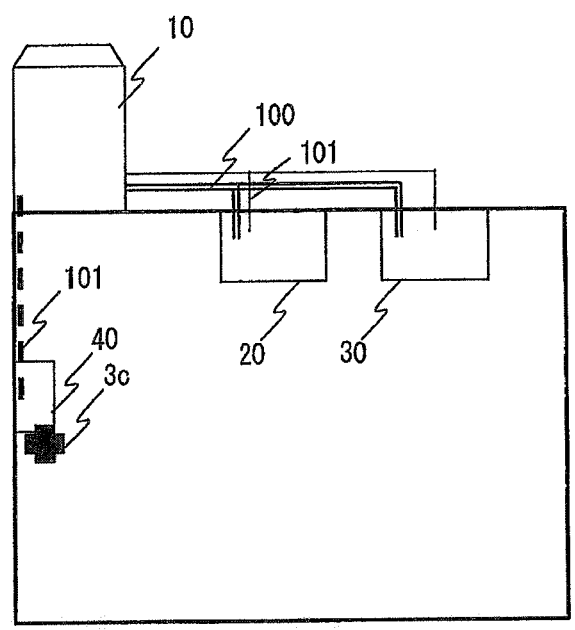
FIG. 1 is a device layout diagram of an air-conditioning system according to Embodiment 1 of the present invention.

Embodiment 1.
<<System Configuration>>
FIG. 1 is a device layout diagram of an air-conditioning system (refrigeration and air-conditioning apparatus) according to Embodiment 1 of the present invention. An outdoor unit 10 is connected to a humidity control device 20 and an indoor unit 30. The outdoor unit 10 and the humidity control device 20 are connected and the outdoor unit 10 and the indoor unit 30 are connected, both by a transmission line 101 and a pipe 100 through which a cooling fluid circulates. The outdoor unit 10 and a controller 40 are also connected by the transmission line 101. A temperature-and-humidity sensor 3c is disposed at a lower section of the controller 40.

Although a single humidity control device 20 and a single indoor unit are connected in FIG. 1, the number of connected devices is not limited and may be individually changed in accordance with the capacity of the outdoor unit and the required amount of dehumidification.

Figure 2:
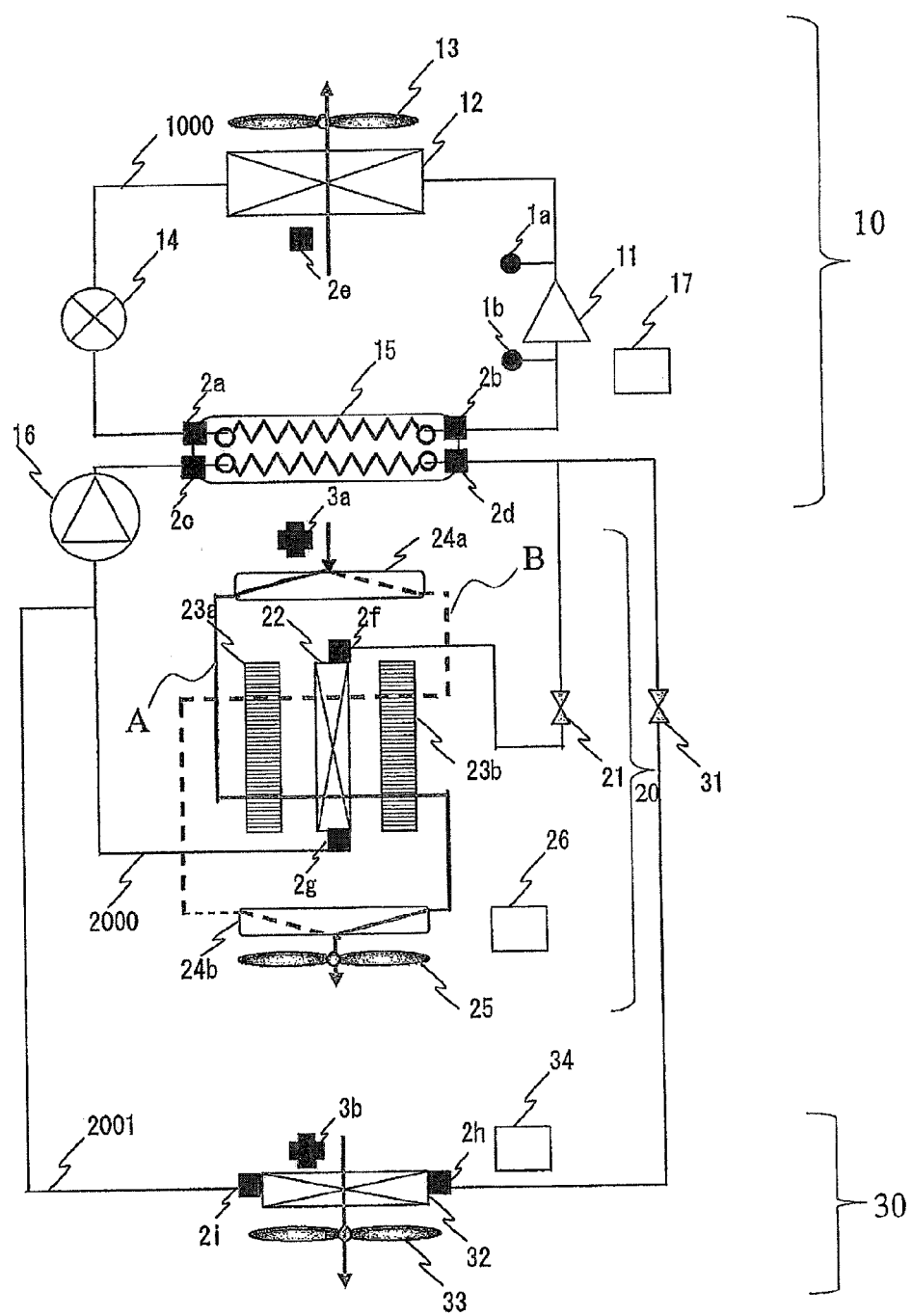
FIG. 2 is a refrigerant circuit diagram of the air-conditioning system according to Embodiment 1 of the present invention.

<<Refrigerant Circuit Configuration: Outdoor Unit 10>>
FIG. 2 is a refrigerant circuit diagram of the air-conditioning system according to Embodiment 1 of the present invention.

The outdoor unit 10 includes a compressor 11 that compresses a refrigerant, a condenser 12 that condenses the refrigerant compressed by the compressor 11, air-sending means 13 that sends air toward the condenser 12, expansion means 14 that reduces the pressure of the refrigerant condensed by the condenser 12, an evaporator 15 that evaporates the refrigerant with its pressure reduced by the expansion means 14, and transport means 16 that transports a cooling fluid to the evaporator 15. A refrigerant circuit that returns the refrigerant to the compressor 11 via the compressor 11, the condenser 12, the expansion means 14, and the evaporator 15 constitutes a refrigerant cycle 1000.

(Compressor 11)
The compressor 11 is capable of varying the operation capacity and is a positive-displacement compressor that is driven by a motor (not shown) controlled by an inverter. In the present invention, the number of compressors 11 is not limited to one, and two or more compressors may be connected in parallel or in series.

(Condenser 12)

The condenser 12 is a cross-fin-type fin-and-tube heat exchanger constituted of a heat-transfer pipe and multiple fins.

(Air-Sending Means 13)

The air-sending means 13 is a fan that is capable of varying the flow rate of air to be supplied to the condenser 12, and is, for example, a centrifugal fan or a multiblade fan that is driven by a motor, such as a DC fan motor.

(Expansion Means 14)

The expansion means 14 is capable of, for example, adjusting the flow rate of the refrigerant flowing through the refrigerant circuit, and is an electronic expansion valve whose opening degree can be controlled by a stepping motor (not shown), a mechanical expansion valve having a diaphragm used for a pressure receiver, or a capillary tube.

(Evaporator 15)

The evaporator 15 is a plate-type heat exchanger formed by arranging many thin plates with distances therebetween and sealing the peripheral edges thereof such that the spaces formed between the thin plates alternately serve as low-pressure refrigerant flow passages and water flow passages, or a double-pipe heat exchanger that performs heat exchange at the inner and outer sides of a double-walled pipe. Although only one evaporator 15 is used in Embodiment 1 of the present invention, the number of evaporators 15 is not limited thereto, and two or more evaporators 15 may be connected in parallel or in series. Furthermore, although the refrigerant and the cooling fluid flow parallel to each other in Embodiment 1 of the present invention, they may flow in opposite directions, and the flowing directions thereof are not limited.

(Transport Means 16)

The transport means 16 is a pump that is driven by a motor, such as a DC motor, which can control the flow rate of fluid circulating through a cooling-fluid circuit.

(Cooling Fluid and Refrigerant)

The cooling fluid is, for example, water mixed with an additive that lowers the freezing point, or may be pure water. The refrigerant flowing through the refrigerant circuit is, for example, an HFC refrigerant such as R410A, R407C, or R404A, an HCFC refrigerant such as R22 or R134a, or a natural refrigerant such as hydrocarbon or helium.

<<Cooling-Fluid Circuit Configuration: Humidity Control Device 20>>

In the humidity control device 20, a sensible heat exchange cycle 2000 is constituted by a first heat exchanger 22 that exchanges heat between the cooling fluid, which has exchanged heat at the evaporator 15, and air in an air-conditioned space, air-sending means 25 that sends air toward the first heat exchanger 22, and a cooling-fluid circuit that returns the cooling fluid to the transport means 16 (which is accommodated within the outdoor unit 10) via the transport means 16, the evaporator 15, and the first heat exchanger 22.

Furthermore, the humidity control device 20 includes moisture absorbing-and-desorbing devices 23a and 23b and air-flow-passage switching devices 24a and 24b. The humidity control device 20 takes in air from an air-conditioned area or from outside the air-conditioned area, allows the air to pass through the air-flow-passage switching device 24a, then makes the air pass through the moisture absorbing-and-desorbing devices 23a and 23b and the first heat exchanger 22, and subsequently makes the air pass through the air-flow-passage switching device 24b so as to send the air to the air-conditioned area.

A temperature-and-humidity sensor 3a is provided on the air inlet side of the humidity control device 20. Moreover, an operation control signal is transmitted to a control substrate 26 from the controller 40 shown in FIG. 1.

The air-flow-passage switching devices 24a and 24b are capable of switching between an air flow passage A extending through the moisture absorbing-and-desorbing device 23a, the first heat exchanger 22, and the moisture absorbing-and-desorbing device 23b in this order, and an air flow passage B extending through the moisture absorbing-and-desorbing device 23b, the first heat exchanger 22, and the moisture absorbing-and-desorbing device 23a.

The humidity control device 20 includes a two-way valve 21 that can control whether to allow the cooling fluid to circulate through the sensible heat exchange cycle 2000.

(Two-Way Valve 21)

The two-way valve 21 is capable of changing the circulation path of the cooling-fluid circuit. When the valve is opened, the cooling fluid can flow into the first heat exchanger 22, and when the valve is closed, the cooling fluid can be prevented from flowing into the first heat exchanger 22. For the opening and closing of the valve, for example, a motor (not shown) is used so that the opening and closing can be controlled.

Furthermore, by adjusting the opening degree of the two-way valve 21 by controlling the rotation speed of the motor, the flow rate of the cooling fluid flowing into the evaporator 15 can be controlled. Alternatively, the controlling of the flow rate of the cooling fluid flowing into the evaporator 15 may be performed based on another method, such as providing a bypass passage by using a three-way valve, and is not limited to the use of the two-way valve so long as a similar effect can be achieved.

(First Heat Exchanger 22)

The first heat exchanger 22 is, for example, a cross-fin-type fin-and-tube heat exchanger constituted of a heat-transfer pipe and multiple fins.

(Moisture Absorbing-and-Desorbing Devices 23a and 23b)

Each of the moisture absorbing-and-desorbing devices 23a and 23b is formed of, for example, a polygonal flat porous plate extending along the cross section of an air passage so that a large airflow cross-sectional area can be obtained relative to the air-passage cross-sectional area of the device, and is configured to allow air to travel in the thickness direction of the device. Moreover, the surface of the flat porous plate is coated with, surface-treated with, or impregnated with an absorbent that absorbs moisture from air with a relatively high humidity and that releases moisture to air with a relatively low humidity. Examples of the absorbent include zeolite, silica gel, and activated carbon. Although rectangular moisture absorbing-and-desorbing devices have been described here, the shape thereof is not limited to a rectangular shape so long as a similar effect can be achieved.

(Air-Flow-Passage Switching Devices 24a and 24b)

The air-flow-passage switching devices 24a and 24b are dampers that open and close air-passage inlets and outlets using the driving force of, for example, stepping motors so as to switch between the air flow passages A and B. By receiving an operation control signal from the control substrate 26, the timing of switching between opening and closing can be controlled. Although the switching between the air flow passages A and B is performed by two air-flowpassage switching devices 24a and 24b in Embodiment 1, it may be performed by controlling four dampers or by using a single motor, and the number of dampers is not limited so long as a similar effect can be achieved. Moreover, each of the air-flow-passage switching devices 24a and 24b may have a mechanism that opens one flow passage and closes the other flow passage by using a slidable door.

(Air-Sending Means 25)

The air-sending means 25 is a fan that is capable of varying the flow rate of air to be supplied to the first heat exchanger 22, and is, for example, a centrifugal fan or a multiblade fan that is driven by a motor, such as a DC fan motor.

<<Cooling-Fluid Circuit Configuration: Outdoor Unit 30>>

In the indoor unit 30, a sensible heat exchange cycle 2001 is constituted by a second heat exchanger 32 that exchanges heat between the cooling fluid, which has exchanged heat at the evaporator 15, and the air in the air-conditioned space, air-sending means 33 that sends air toward the second heat exchanger 32, and a cooling-fluid circuit that returns the cooling fluid to the transport means 16 via the transport means 16, the evaporator 15, and the second heat exchanger 32.

The indoor unit 30 takes in air from the air-conditioned area, allows the air to pass through the second heat exchanger 32, and then sends the air to the air-conditioned area. An inlet temperature-and-humidity sensor 3b is provided on the air inlet side of the indoor unit 30. Moreover, an operation control signal is transmitted to a control substrate 34 from the controller 40 shown in FIG. 1.

The indoor unit 30 includes a two-way valve 31 that can control whether or not to allow the cooling fluid to circulate through the sensible heat exchange cycle 2001.

(Two-Way Valve 31)

The two-way valve 31 is capable of changing the circulation path of the cooling-fluid circuit. When the two-way valve 31 is opened, the cooling fluid can flow into the second heat exchanger 32, and when the two-way valve 31 is closed, the cooling fluid can be prevented from flowing into the first heat exchanger 22. The opening and closing of the valve can be controlled using, for example, a motor (not shown).

Furthermore, by adjusting the opening degree of the two-way valve 31 by controlling the rotation speed of the motor, the flow rate of the cooling fluid flowing into the second heat exchanger 32 can be controlled. Alternatively, the controlling of the flow rate of the cooling fluid flowing into the second heat exchanger 32 may be performed based on another method, such as providing a bypass passage by using a three-way valve, and is not limited to the use of the two-way valve so long as a similar effect can be achieved.

(Second Heat Exchanger 32)

The second heat exchanger 32 is, for example, a cross-fin-type fin-and-tube heat exchanger constituted of a heat-transfer pipe and multiple fins.

<<Refrigerant Circuit Sensor Arrangement>>

Pressure sensors 1a and 1b are provided on the outlet and inlet sides, respectively, of the compressor 11. Furthermore, a temperature sensor 2a that detects the temperature of a low-pressure refrigerant liquid flowing into the evaporator 15, and a temperature sensor 2b that detects the temperature of the low-pressure refrigerant liquid flowing out from the evaporator 15 are provided. Moreover, a temperature sensor 2e is provided on the air inlet side of the condenser 12.

<<Cooling-Fluid Circuit Sensor Arrangement>>

A temperature sensor 2c that detects the temperature of the cooling fluid flowing into the evaporator 15 and a temperature sensor 2d that detects the temperature of the cooling fluid flowing out from the evaporator 15 are provided. Furthermore, the temperature-and-humidity sensor 3a is provided on the air inlet side of the humidity control device 20, and the temperature-and-humidity sensor 3b is provided on the air inlet side of the indoor unit 30. Moreover, a temperature sensor 2f that detects the temperature of the cooling fluid flowing into the first heat exchanger 22 and a temperature sensor 2g that detects the temperature of the cooling fluid flowing out from the first heat exchanger 22 are provided. Likewise, a temperature sensor 2h that detects the temperature of the cooling fluid flowing into the second heat exchanger 32 and a temperature sensor 2i that detects the temperature of the cooling fluid flowing out from the second heat exchanger 32 are provided.

<<System Constituent Devices>>

The outdoor unit 10 is provided with the air-sending means 13 for causing air to flow to the condenser 12, and an operation control signal is transmitted to a control substrate 17 from the controller 40 shown in FIG. 1.

The humidity control device 20 is provided with the air-sending means 25. The humidity control device 20 takes in air from the air-conditioned space, outside air, or a mixture of the air from the air-conditioned space and the outside air, allows the air to pass through the air-flow-passage switching device 24a, then makes the air pass through the moisture absorbing-and-desorbing devices 23a and 23b and the first heat exchanger 22, and subsequently makes the air pass through the air-flow-passage switching device 24b so as to send the air to the air-conditioned space. Furthermore, an operation control signal is transmitted to the control substrate 26 from the controller 40.

The humidity control device 20 includes the air-flow-passage switching devices 24a and 24b capable of switching the internal air flow passage between the air flow passage A extending through the moisture absorbing-and-desorbing device 23a, the first heat exchanger 22, and the moisture absorbing-and-desorbing device 23b in this order and the air flow passage B extending through the moisture absorbing-and-desorbing device 23b, the first heat exchanger 22, and the moisture absorbing-and-desorbing device 23a.

The indoor unit 30 is provided with the air-sending means 33. The indoor unit 30 takes in air from the air-conditioned space, allows the air to pass through the second heat exchanger 32, and then sends the air to the air-conditioned space. Furthermore, an operation control signal is transmitted to the control substrate 34 from the controller 40.

<<Operation of Refrigeration Cycle 1000>>

The operation of the refrigerant cycle 1000 will be described with reference to FIG. 2. The refrigerant discharged from the compressor 11 flows to the condenser 12, where it condenses and liquefies upon exchanging heat with air. After the refrigerant is reduced in pressure at the expansion means 14, it flows to the evaporator 15, where it evaporates upon exchanging heat with the cooling fluid, and is subsequently taken into the compressor 11 again.

<<Operation of Sensible Heat Exchange Cycle 2000>>

The operation of the sensible heat exchange cycle 2000 will be described with reference to FIG. 2. The cooling fluid flowing out from the transport means 16 flows to the evaporator 15, where the cooling fluid decreases in temperature upon exchanging heat with the refrigerant. The cooling fluid then flows to the first heat exchanger 22, where the cooling fluid increases in temperature upon exchanging heat with conditioned air, and is subsequently taken into the transport means 16 again.

<<Operation of Sensible Heat Exchange Cycle 2001>>

The operation of the sensible heat exchange cycle 2001 will be described with reference to FIG. 2. The cooling fluid flowing out from the transport means 16 flows to the evaporator 15, where the cooling fluid decreases in temperature upon exchanging heat with the refrigerant. The cooling fluid then flows to the second heat exchanger 32, where it increases in temperature upon exchanging heat with the conditioned air, and is subsequently taken into the transport means 16 again.

Next, cooling and dehumidifying operation of the humidity control device 20 will be described.

<<Dehumidifying Operation>>

First, the air flow passage A will be described with reference to FIG. 3. Air is taken in through an air inlet 20a and passes through the moisture absorbing-and-desorbing device 23a. The absorbent in the moisture absorbing-and-desorbing device 23a undergoes a desorption reaction so as to release moisture into the air, thereby humidifying the passing air. The air that has passed through the moisture absorbing-and-desorbing device 23a then passes through the first heat exchanger 22, which functions as cooling means when a cooling fluid with a temperature lower than that of the air-conditioned space flows therethrough. The passing air is dehumidified by the first heat exchanger 22 by being cooled to the dew-point temperature or lower. The air subsequently flows into the moisture absorbing-and-desorbing device 23b. The absorbent in the moisture absorbing-and-desorbing device 23b absorbs moisture from the air so as to dehumidify the passing air. The air then travels to the air-sending means 25 from an air outlet 20b and is supplied as supply air SA to the indoor side.

Next, the air flow passage B will be described with reference to FIG. 3. Air is taken in through the air inlet 20a and passes through the moisture absorbing-and-desorbing device 23b. The absorbent in the moisture absorbing-and-desorbing device 23b undergoes a desorption reaction so as to release moisture into the air, thereby humidifying the passing air. The air that has passed through the moisture absorbing-and-desorbing device 23b then passes through the first heat exchanger 22, which functions as cooling means when a cooling fluid with a temperature lower than that of the air-conditioned space flows therethrough. The passing air is dehumidified by the first heat exchanger 22 by being cooled to the dew-point temperature or lower. The air subsequently flows into the moisture absorbing-and-desorbing device 23a. The absorbent in the moisture absorbing-and-desorbing device 23a absorbs moisture from the air so as to dehumidify the passing air. The air then travels to the air-sending means 25 from the air outlet 20b and is supplied as supply air SA to the indoor side.

In this case, the air taken in through the air inlet may be the air within the air-conditioned space, the outside air, or a mixture of the two, and the installation location of the air inlet is not limited.

Figure 4:
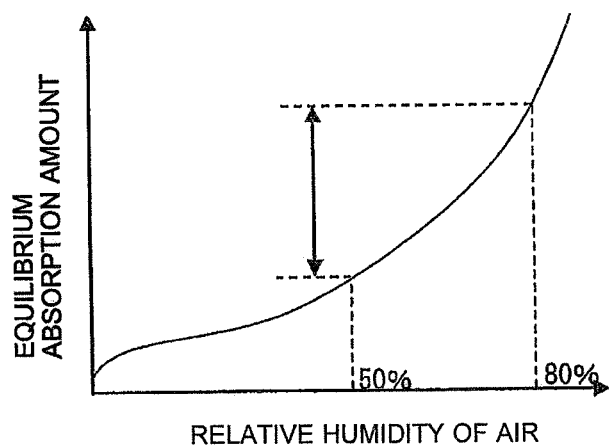
FIG. 4 illustrates the relationship between the equilibrium absorption amount of an absorbent and the relative humidity of air used in the humidity control device according to Embodiment 1 of the present invention.

FIG. 4 illustrates the relationship between the equilibrium absorption amount of the absorbent and the relative humidity of air used in the humidity control device according to Embodiment 1 of the present invention. The equilibrium absorption amount generally increases with increasing relative humidity of air. As the absorbent used in Embodiment 1 of the present invention, one is used which has a large difference between an equilibrium absorption amount corresponding to a relative humidity of 80% or higher and an equilibrium absorption amount corresponding to a relative humidity ranging between 40% and 60%. Therefore, the absorption and desorption capacities in the moisture absorbing-and-desorbing devices 23a and 23b can be increased. Accordingly, with regard to the aforementioned absorbent, it is preferable that the equilibrium absorption amount relative to air with a relative humidity of 40% to 100% increase significantly in a substantially linear manner relative to an increase in relative humidity.

Furthermore, by controlling the amount of air blown by the air-sending means 25, the flow speed of air passing through the moisture absorbing-and-desorbing devices 23a and 23b also changes. Because the speed at which moisture moves between the air and the absorbent during absorption and desorption in the moisture absorbing-and-desorbing devices 23a and 23b increases with increasing flow speed of air, the dehumidifying and humidifying capacities can be increased.

Figure 3:
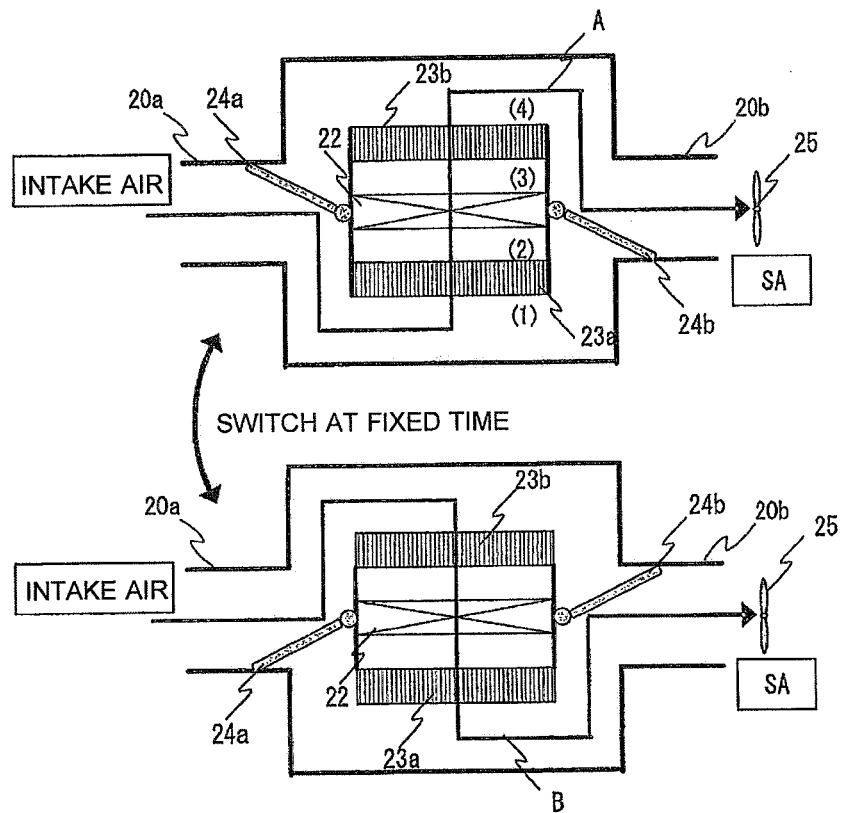
FIG. 3 is a device configuration diagram of a humidity control device according to Embodiment 1 of the present invention.

Although the air-sending means 25 is disposed on the most downstream side as shown in FIG. 3, the air-sending means 25 may alternatively be disposed on the most upstream side so long as the target amount of air for the two air flow passages can be achieved.

Furthermore, a plurality of air-sending means 25 may be disposed on the upstream and downstream sides. The positions where the air-sending means 25 are disposed and the number thereof are not limited.

The air-flow-passage switching devices 24a and 24b used in the humidity control device 20 according to Embodiment 1 of the present invention are capable of switching the air passages by using, for example, dampers. By controlling the motor rotation operation used for the damper operation, the switching time can be controlled.

<<Operation of Humidity Control Device>>

The dehumidifying operation of the humidity control device according to Embodiment 1 of the present invention will be described with reference to FIGS. 3, 5, and 6.

Figure 5:
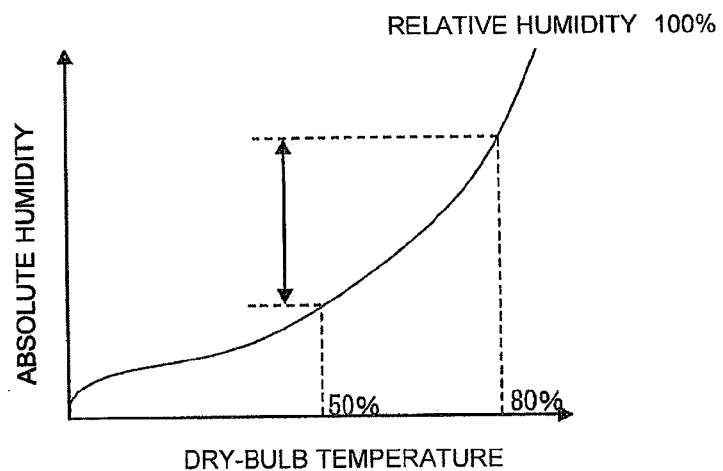
FIG. 5 is a humid-air diagram illustrating the operational state during dehumidifying operation of the humidity control device according to Embodiment 1 of the present invention.

FIG. 5 is a humid-air diagram illustrating the operational state during the dehumidifying operation of the humidity control device according to Embodiment 1 of the present invention.

Figure 6:
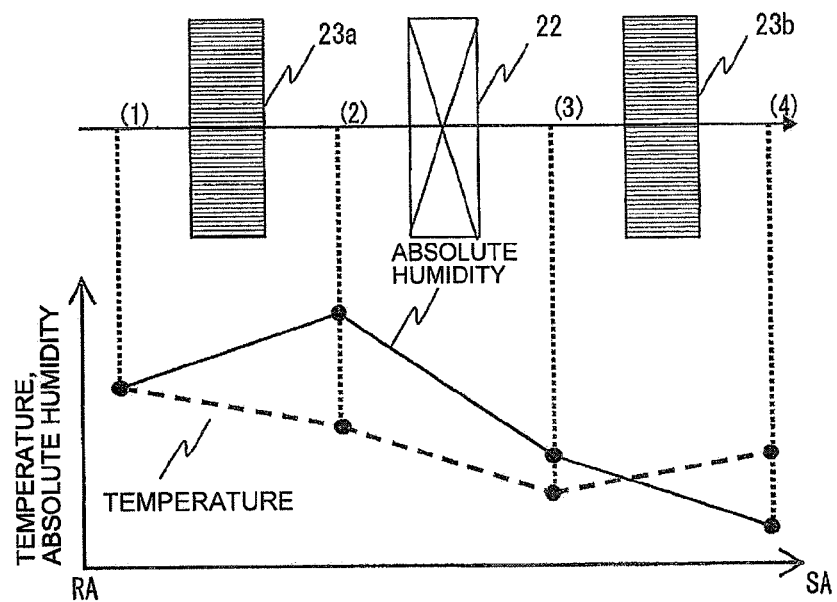
FIG. 6 is a diagram illustrating the operational state during the dehumidifying operation of the humidity control device according to Embodiment 1 of the present invention, and shows the absolute humidity and the temperature at each section.

FIG. 6 is a diagram illustrating the operational state during the dehumidifying operation of the humidity control device according to Embodiment 1 of the present invention, and shows the absolute humidity and the temperature at each section.

In FIG. 5, states (1) to (4) indicating the states of air respectively correspond to numbers 1 to 4 in parentheses in FIG. 3. FIG. 6 shows the absolute humidity and the temperature of passing air in each state (FIG. 6 corresponds to the case of the air flow passage A).

In FIG. 3, the entire humidity control device 20 has the moisture absorbing-and-desorbing devices 23a and 23b that repeat absorption and releasing of moisture, the first heat exchanger 22, the air-sending means 25, and the air-flow-passage switching devices 24a and 24b. With regard to the air-sending means 25, the amount of air thereof can be changed so as to increase the absorption and desorption capacities of the moisture absorbing-and-desorbing devices 23a and 23b. The switching timings of the air-flow-passage switching devices 24a and 24b can be changed.

The air passage within the humidity control device 20 can be switched between the air flow passages A and B in FIG. 3 by controlling the air-flow-passage switching devices 24a and 24b. In the air flow passage A, intake air sequentially passes through the moisture absorbing-and-desorbing device 23a, first heat exchanger 22, and the moisture absorbing-and-desorbing device 23b. In the air flow passage B, intake air sequentially passes through the moisture absorbing-anddesorbing device 23b, the first heat exchanger 22, and the moisture absorbing-and-desorbing device 23a.

<<Operation of Air-Side Circuit>>

(Air Flow Passage A)

The operation of the air-side circuit during the dehumidifying operation will be described with reference to FIGS. 5 and 6.

In a dehumidifying path of the humidity control device according to Embodiment 1 of the present invention, intake air (state 1) taken in through the air inlet is sent to the moisture absorbing-and-desorbing device 23a. Since the moisture absorbing-and-desorbing device 23a releases moisture in accordance with the moisture content, intake air with a relative humidity of 40% to 60% is humidified (state 2). With regard to the humidified air, the temperature thereof becomes lower than that of the intake air, and the relative humidity thereof increases. In addition, because of an increase in dew-point temperature, the intake air can easily condense. The humidified intake air flows into the first heat exchanger 22 where the passing air is cooled to the dew-point temperature or lower, so as to become dehumidified air from which moisture is removed (state 3). The air is then sent to the moisture absorbing-and-desorbing device 23b. Because the relative humidity of the cooled and dehumidified air is high at about 70% RH to 90% RH, the absorbent in the moisture absorbing-and-desorbing device 23b readily absorbs moisture. The moisture in the cooled intake air is absorbed and removed by the absorbent in the moisture absorbing-and-desorbing device 23b, and the passing air becomes supply air SA (state 4), which is then supplied indoors.

(Air Flow Passage B)

In the dehumidifying path of the humidity control device according to the present invention, intake air taken in through the air inlet is sent to the moisture absorbing-and-desorbing device 23b (state 1). Since the moisture absorbing-and-desorbing device 23b releases moisture in accordance with the moisture content, intake air with a relative humidity of 40% to 60% is humidified (state 2). With regard to the humidified air, the temperature thereof becomes lower than that of the intake air, and the relative humidity thereof increases. In addition, because of an increase in dew-point temperature, the intake air can easily condense. The humidified intake air flows into the first heat exchanger 22, where the passing air is cooled to the dew-point temperature or lower, so as to become dehumidified air from which moisture is removed (state 3). The air is then sent to the moisture absorbing-and-desorbing device 23a. Because the relative humidity of the cooled and dehumidified air is high at about 70% RH to 90% RH, the absorbent in the moisture absorbing-and-desorbing device 23a readily absorbs moisture. The moisture in the cooled intake air is absorbed and removed by the absorbent in the moisture absorbing-and-desorbing device 23a, and the passing air becomes supply air SA (state 4), which is then supplied indoors.

As described above, by switching between the air flow passages A and B by activating the air-flow-passage switching devices 24a and 24b, the moisture absorbing-and-desorbing device 23b having undergone an absorption reaction at the air flow passage A undergoes a desorption reaction at the air flow passage B, or the moisture absorbing-and-desorbing device 23a having undergone a desorption reaction at the air flow passage A undergoes an absorption reaction at the air flow passage B. Therefore, the absorbent does not come to an equilibrium, thereby allowing for continuous dehumidification.

The air-flow-passage switching device 24a is disposed upstream of the moisture absorbing-and-desorbing devices 23a and 23b and the first heat exchanger 22, and the air-flow-passage switching device 24b is disposed downstream of the moisture absorbing-and-desorbing devices 23a and 23b and the first heat exchanger 22.

<<Evaporator 15>>

Figure 7:
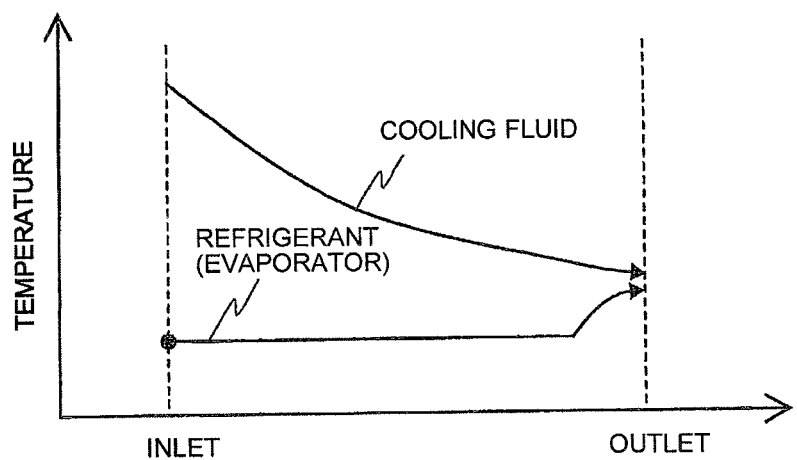
FIG. 7 is a temperature diagram illustrating a change in temperature of a cooling fluid and a change in temperature of a refrigerant within an evaporator of the air-conditioning system according to each of Embodiments 1 and 2 of the present invention.

FIG. 7 is a temperature diagram illustrating a change in temperature of the cooling fluid and a change in temperature of the refrigerant within the evaporator 15 of the air-conditioning system according to each of Embodiments 1 and 2 (Embodiment 2 will be described later) of the present invention, and illustrates the changes in temperature of the cooling fluid and the refrigerant within the evaporator 15. The refrigerant passing through the evaporator changes from a liquid phase to a gas phase by receiving heat when the refrigerant evaporates. After the refrigerant entirely changes into gas, its temperature increases (i.e., degree of superheat). On the other hand, the cooling fluid decreases in temperature and travels toward the outlet without a change in phase. The lower cooling temperature limit for the cooling fluid is equal to the refrigerant evaporating temperature.

<<First and Second Heat Exchangers 22 and 32>>

Figure 8:
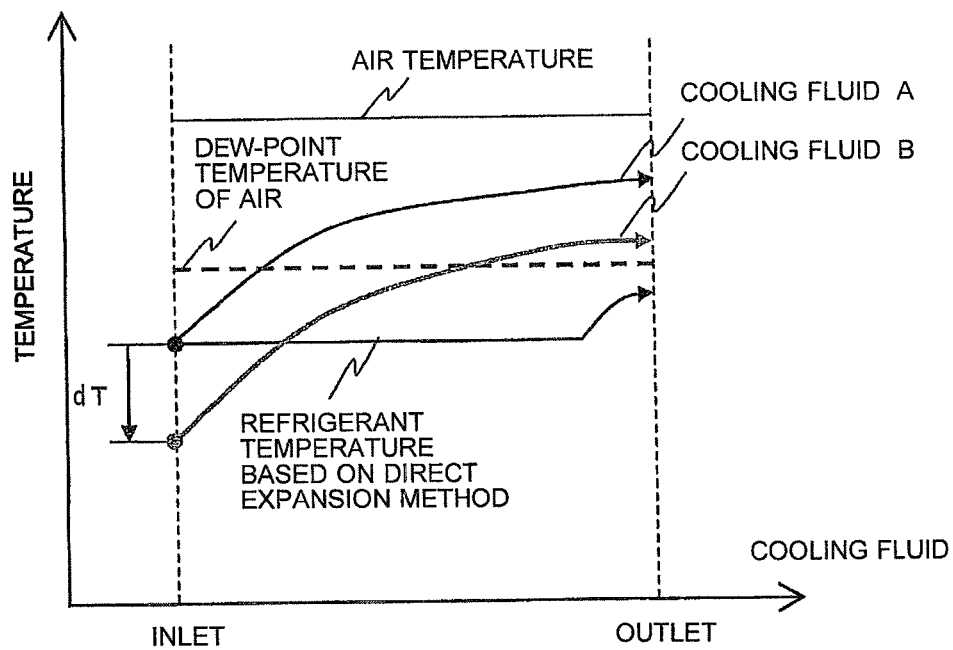
FIG. 8 is a temperature diagram illustrating a change in temperature of the cooling fluid within each heat exchanger in the air-conditioning system according to each of Embodiments 1 and 2 of the present invention.

FIG. 8 is a temperature diagram illustrating a change in temperature of the cooling fluid within each heat exchanger in the air-conditioning system according to each of Embodiments 1 and 2 of the present invention. FIG. 8 shows changes in temperature of the cooling fluid within the first heat exchanger 22 disposed in the humidity control device 20 and the cooling fluid within the second heat exchanger 32 disposed in the indoor unit 30. The cooling fluid passing through each of the heat exchangers 22 and 32 increases in temperature upon exchanging heat with air passing through the heat exchanger. The air passing through each of the heat exchangers 22 and 32 is cooled and supplied as supply air SA to the air-conditioned space. If the temperature of the cooling fluid undergoing heat exchange as the cooling fluid passes is equal to the dew-point temperature, the cooling fluid is cooled and dehumidified upon condensation. If the temperature is equal to or higher than the dew-point temperature, only the temperature changes without dehumidification.

When the change in temperature of the refrigerant within each heat exchanger based on the direct expansion method and the change in temperature of the cooling fluid within the heat exchanger are compared in FIG. 8, in the case where the inlet temperature is the same, dehumidification is possible in the entire heat exchanger because the refrigerant temperature does not change due heat absorption based on a change in phase in the direct expansion method. However, since the temperature of a cooling fluid A is equal to or higher than the dew point due to heat exchange, dehumidification is not possible. In other words, in order to obtain an amount of dehumidification equal to that in the direct expansion method, it is necessary to further reduce the temperature of the cooling fluid by dT (cooling fluid B).

Figure 9:
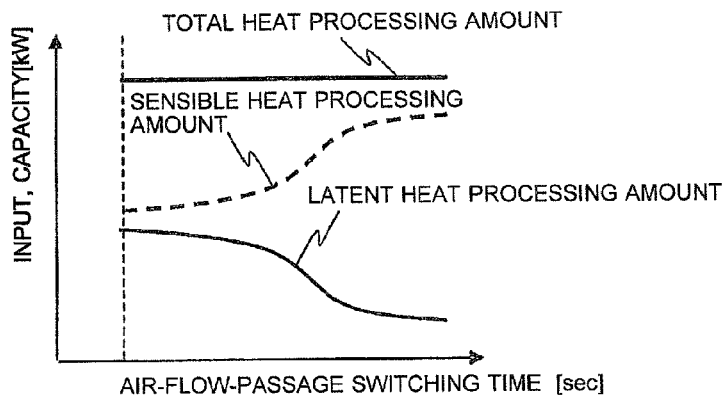
FIG. 9 illustrates the relationships among the input, the total amount of heat treatment, the amount of sensible heat treatment, and the amount of latent heat treatment that depend on the difference in air-flow-passage switching cycle in the air-conditioning system according to each of Embodiments 1 and 2 of the present invention.

FIG. 9 illustrates the relationships among the input, the total amount of heat treatment, the amount of sensible heat treatment, and the amount of latent heat treatment that depend on the difference in air-flow-passage switching cycle in the air-conditioning system according to each of Embodiments 1 and 2 of the present invention.

Figure 10:
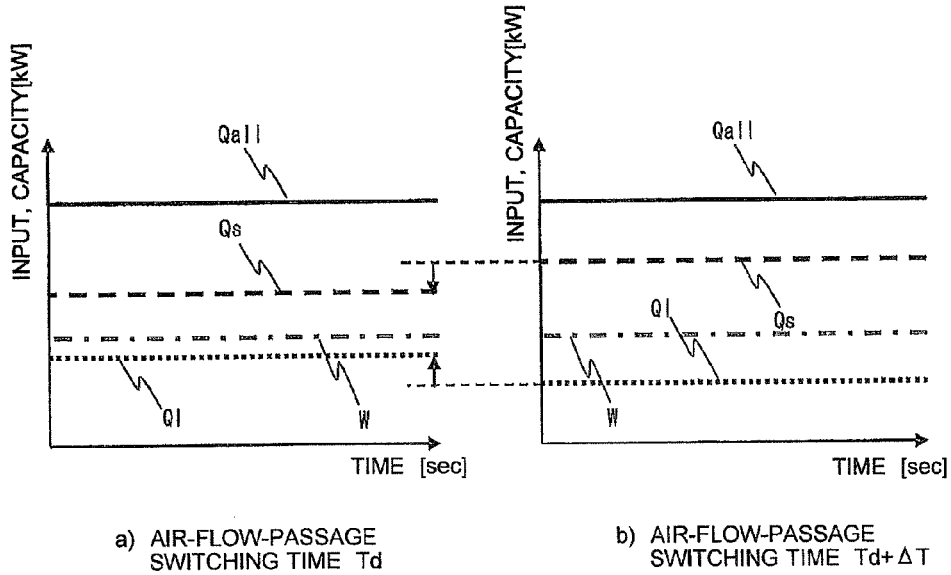
FIG. 10 illustrates the relationships among the input, the total amount of heat treatment, the amount of sensible heat treatment, and the amount of latent heat treatment in air-flow-passage switching cycles T and T+ΔT in the air-conditioning system according to each of Embodiments 1 and 2 of the present invention.

FIG. 10 illustrates the relationships among the input, the total amount of heat treatment, the amount of sensible heat treatment, and the amount of latent heat treatment in air-flow-passage switching cycles T and T+ΔT in the air-conditioning system according to each of Embodiments 1 and 2 of the present invention.

When the switching timing between the air flow passages A and B is delayed, the absorbent becomes saturated and thus does not undergo absorption and desorption reactions, generating a time period in which the first heat exchanger 22 alone performs a heat treatment. In this case, since the dew-point temperature of the air passing through the first heat exchanger 22 is equal to that of the indoor air, the amount of dehumidification decreases from that at the initial stage after the switching of the air flow passages.

Furthermore, in a case where the refrigerant evaporating temperature is equal to or higher than the indoor-air dew-point temperature, only a sensible heat treatment is performed and a latent heat treatment is not performed after the absorbent becomes saturated. Therefore, when the switching timing between the air flow passages A and B is delayed, a time period in which the absorbent becomes saturated and the latent heat treatment amount decreases or diminishes occurs, thus decreasing the amount of dehumidification per unit time.

However, although the temperature and the humidity of the air passing through the first heat exchanger 22 at the initial stage of the switching of the air flow passages are the same as those of the air passing through the first heat exchanger 22 after the absorbent is saturated, the enthalpy of the air is substantially the same.

This is because, when the air and the absorbent undergo absorption and desorption reactions, the temperature and the humidity of the air change along a substantially isenthalpic line. Therefore, although the latent heat treatment amount and the sensible heat treatment amount change in response to a change in switching timing cycle as in FIGS. 9 and 10, a heat treatment is possible without any change in total heat treatment amount. The term "input" along the vertical axis in each of FIGS. 9 and 10 refers to power consumption of the entire apparatus.

Furthermore, the time taken for the absorbent held in each of the moisture absorbing-and-desorbing devices 23a and 23b to be saturated is determined on the basis of the evaporating temperature of the refrigerant flowing through the evaporator 15 and the temperature and the humidity of the air, which are measurement results obtained by the temperature sensor 2a. By changing ΔT in accordance with the determined time, the time taken to reach the target temperature and humidity can be shortened.

<<Latent-Sensible Separation Control>>

Figure 11:
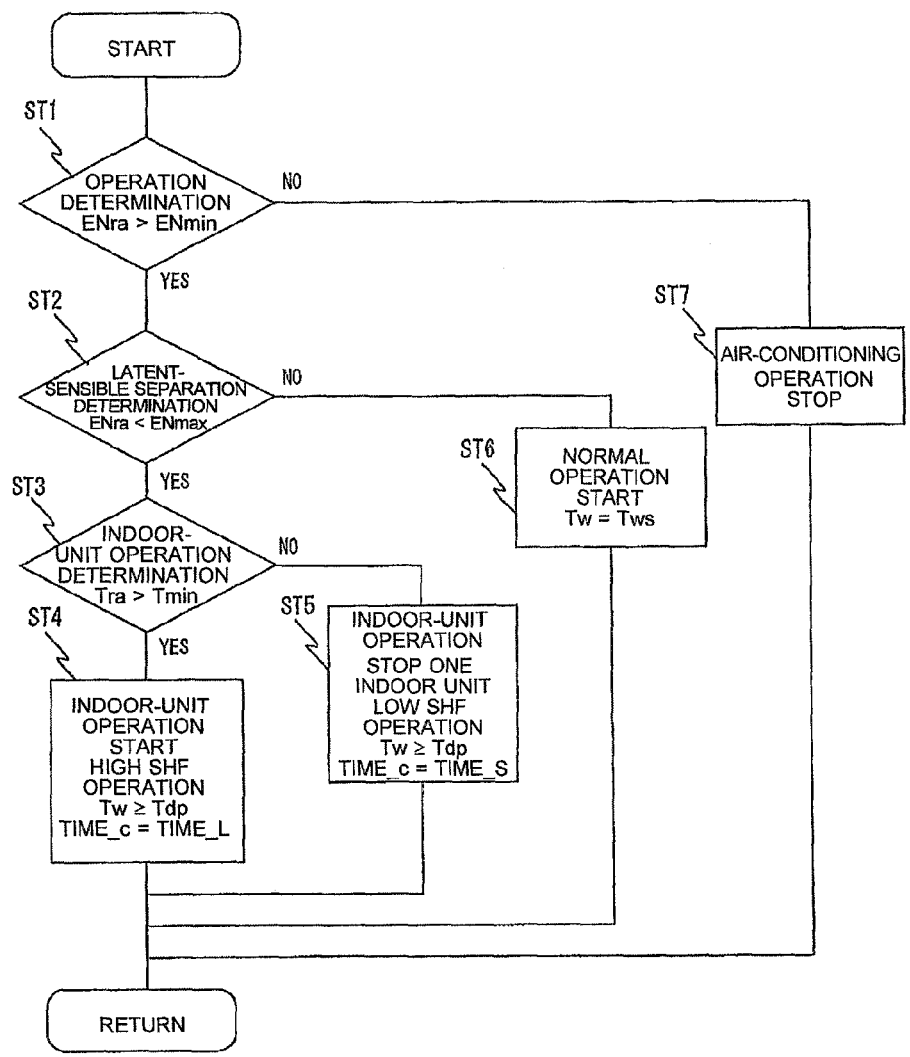
FIG. 11 is a control flowchart of the air-conditioning system according to each of Embodiments 1 and 2 of the present invention.

This air-conditioning system includes control means for changing the temperature of the cooling fluid at the outlet of the evaporator 15 in the air-conditioning system on the basis of the state quantity of indoor air. Details of this latent-sensible separation control will be described below with reference to a flowchart in FIG. 11.

First, it is determined at the controller 40 whether the air-conditioning system is to start or stop its operation on the basis of the relationship between operation-start determination enthalpy ENmin, which is calculated from a preset indoor temperature set from the outside and a preset relative humidity, and indoor enthalpy ENra calculated from a measurement result obtained by one of the temperature-and-humidity sensors 3a to 3c (step ST1).

If the indoor enthalpy ENra is larger than the operation-start determination enthalpy ENmin, the air-conditioning system starts its operation (step ST2). If the indoor enthalpy ENra is smaller than the operation-start determination enthalpy ENmin, the air-conditioning system stops its operation (step ST7).

In step ST2, it is determined at the controller 40 whether the air-conditioning system is to start or stop its latent-sensible separation operation on the basis of the relationship between latent-sensible-separation determination enthalpy ENmax, which is calculated from the preset indoor temperature set from the outside and the preset relative humidity, and the indoor enthalpy ENra calculated from the measurement result obtained by the temperature-and-humidity sensor 3b.

If the indoor enthalpy ENra is smaller than the latent-sensible-separation determination enthalpy ENmax, the latent-sensible separation operation is started (step ST3). In this case, the target temperature for the cooling fluid at the outlet of the evaporator 15 is set to a value close to the dew-point temperature of the indoor air or a value equal to or larger than the dew-point temperature.

If the indoor enthalpy ENra is larger than the latent-sensible-separation determination enthalpy ENmax, the air-conditioning system does not perform latent-sensible separation and starts its operation with an outlet temperature Tw of the cooling fluid at the evaporator 15 as a preset temperature Tws (step ST6).

In step ST3, it is determined at the controller 40 whether the indoor unit is to start or stop its operation on the basis of the relationship between an indoor-unit operation determination temperature Tmin calculated from the preset indoor temperature set from the outside and an indoor temperature Tra which is a measurement result obtained by the temperature-and-humidity sensor 3b.

If the indoor temperature Tra is higher than the indoor-unit operation determination temperature Tmin, the indoor unit starts its operation, and the humidity control device 20 sets an air-passage switching timing TIME_C to TIME_L and increases SHF of the heat treatment amount (step ST4).

If the indoor temperature Tra is equal to or lower than the indoor-unit operation determination temperature Tmin, the indoor unit stops its operation. Furthermore, the humidity control device 20 sets the air-passage switching timing TIME_C to TIME_S, which is shorter than TIME_L, and decreases the SHF of the heat treatment amount (step ST5).

<<System Control Method>>

Figure 12:
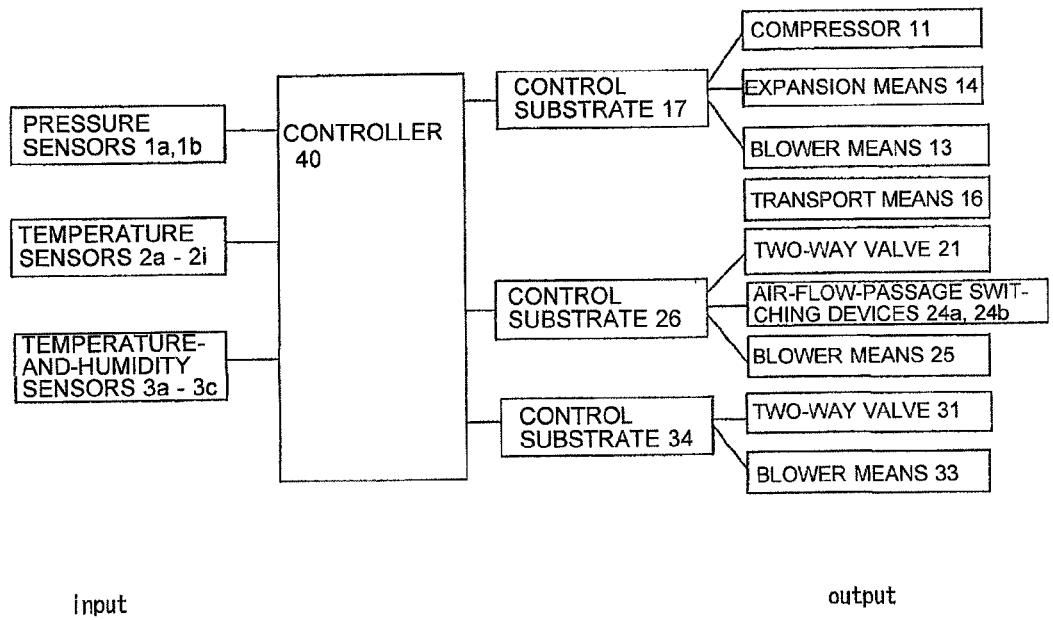
FIG. 12 is a control block diagram of the air-conditioning system according to each of Embodiments 1 and 2 of the present invention.

FIG. 12 is a control block diagram of the air-conditioning system according to each of Embodiments 1 and 2 of the present invention. In FIG. 12, a calculation control system configuration constituted of the pressure sensors 1a and 1b, the temperature sensors 2a to 2i, and the temperature-and-humidity sensors 3a to 3c is shown.

These sensors are connected to the controller 40. The controller 40 can control the operations of the compressor 11, the expansion means 14, the air-sending means 13, the transport means 16, the two-way valve 21, the air-sending means 25, the air-flow-passage switching devices 24a and 24b, the two-way valve 31, and the air-sending means 33 by obtaining temperature-and-humidity information and pressure information from these sensors and transmitting control signals to the control substrates 17, 26, and 34.

<<Advantages of Embodiment 1>>

Figure 13:
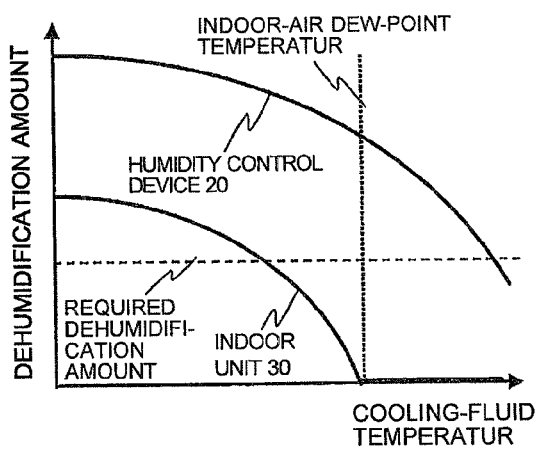
FIG. 13 illustrates the relationship between the amount of dehumidification and the refrigerant evaporating temperature during cooling and dehumidifying operation of the humidity control device and an indoor unit in the air-conditioning system according to each of Embodiments 1 and 2 of the present invention.

As described above, the air-conditioning system according to Embodiment 1 of the present invention can perform dehumidification even when the temperature of the cooling fluid flowing into the humidity control device 20, the first heat exchanger 22, and the second heat exchanger 32 of the indoor unit 30 is increased to be close to the dew-point temperature during cooling and dehumidifying operation, as shown in FIG. 13.

Figure 14:
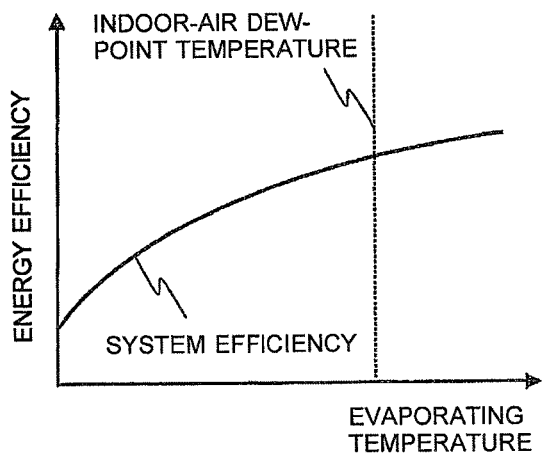
FIG. 14 illustrates the relationship between the refrigerant evaporating temperature and the system energy efficiency in the air-conditioning system according to each of Embodiments 1 and 2 of the present invention.

Increasing the outlet temperature of the cooling fluid at the evaporator 15 leads to an increase in refrigerant evaporating temperature on the refrigeration cycle side. As shown in FIG. 14, the refrigerant cycle increases the refrigerant evaporating temperature so as to improve the efficiency of the system, thereby reducing the power consumption relative to the heat treatment amount.

In an air-conditioning system in the conventional technique, two outdoor units are disposed so as to improve the efficiency of the system. One of the outdoor units is connected to an indoor unit in which the temperature of cooling fluid flowing into a heat exchanger is reduced by controlling the evaporating temperature in the refrigeration cycle to be low, whereby the amount of dehumidification is ensured. The other outdoor unit is connected to an indoor unit in which the temperature of cooling fluid flowing into a heat exchanger is increased by controlling the evaporating temperature in the refrigeration cycle to be high, whereby higher efficiency is achieved.

In contrast, in the air-conditioning system according to Embodiment 1 of the present invention, the humidity control device 20 and the indoor unit 30 are connected to the same outdoor unit, and the amount of dehumidification can be ensured even when the evaporating temperature in the refrigeration cycle is controlled to be high. Therefore, it is not necessary to dispose a dedicated outdoor unit for dehumidification or to add a refrigeration cycle.

In addition, since the evaporating temperature can be controlled to be high, both higher efficiency and compactness of the system can be achieved.

In a moisture absorbing-and-desorbing device in the conventional technique, heating from a heat source is necessary during desorption, which leads to an increase in size of the device due to addition of heating means and also leads to an increase in power consumption. Moreover, even if heat wasted by a condenser of an outdoor unit is utilized, the number of pipes connected to the moisture absorbing-and-desorbing device increases.

In contrast, the air-conditioning system according to Embodiment 1 of the present invention uses moisture absorbing-and-desorbing devices that have given desorbing properties even in a non-heated state, so that problems such as an increase in the number of connected pipes and an increase in power consumption do not occur. Thus, similar connection with an indoor unit in the conventional technique is possible, thereby facilitating the replacement of an air-conditioning system in the conventional technique.

Furthermore, in the air-conditioning system according to Embodiment 1 of the present invention, the moisture absorbing-and-desorbing devices 23a and 23b and the first heat exchanger 22 are disposed substantially in series in the air flowing direction in either of the air flow passages A and B, and the first heat exchanger 22 is provided between the moisture absorbing-and-desorbing devices 23a and 23b.

Accordingly, the moisture absorbing-and-desorbing devices 23a and 23b and the first heat exchanger 22 are disposed such that the surfaces thereof along which air passes face each other or are substantially parallel to each other. Thus, these devices can be accommodated in a small space within the air passage, thereby allowing for a size reduction of the dehumidifier. Note that the angle at which the aforementioned surfaces face each other may slightly deviate from a standard, and a similar advantage can be achieved.

Furthermore, in the air-conditioning system according to Embodiment 1 of the present invention, if there are pluralities of indoor units and humidity control devices connected to a heat source unit, the dehumidification capacity can be changed in accordance with the environment by changing the balance in the number of installed indoor units and installed humidity control devices. Thus, the target temperature and humidity can be maintained without changing the evaporating temperature in the compressor relative to the settings of the target temperature and humidity or performing capacity control based on start-stop operation of the compressor, and a decrease in efficiency upon changing the frequency of the compressor and the occurrence of loss upon capacity rise due to start-stop operation can be reduced, thereby saving energy.

Figure 15:
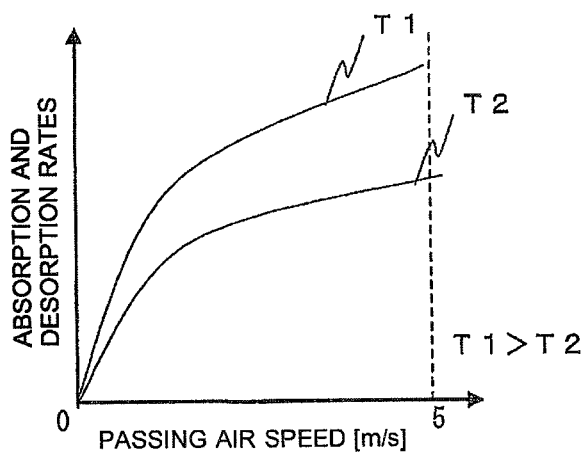
FIG. 15 illustrates the relationship between the passing air speed and the absorption and desorption rates of the absorbent used in the humidity control device according to each of Embodiments 1 and 2 of the present invention.

Furthermore, each moisture absorbing-and-desorbing device used in the air-conditioning system according to Embodiment 1 of the present invention uses an absorbent with a large equilibrium absorption amount in a high humidity range as shown in FIG. 15, so that desorption is possible based only on the difference in equilibrium absorption amount determined from the relative humidity of air and the moisture content in the moisture absorbing-and-desorbing device 23a or 23b. Thus, heating means is omitted so that the device can be reduced in size.

Furthermore, in the air-conditioning system according to Embodiment 1 of the present invention, the relative humidity is set to 80% or higher and an absorbent with a particularly large equilibrium absorption amount is used at the dehumidifier, so that desorption is performed without heating means. Thus, the humidity control device 20 does not need to perform treat the amount of heat obtained by the passing air due to a desorption heat source, so that the cooling means performs only a heat treatment on return air RA, thereby saving energy.

Moreover, as shown in FIG. 15, the absorption and desorption rates of the absorbent used in each of the moisture absorbing-and-desorbing devices 23a and 23b have not only air speed dependence but also temperature dependence. This means that the higher the temperature, the higher the absorption and desorption rates become. Therefore, if the temperature of air upon absorption and the temperature of air upon desorption have a large difference, the absorption and desorption rates also have a large difference. However, the total amount of moisture moving during the absorption and desorption processes reaches an equilibrium in accordance with the lower one of the absorption and desorption rates.

In the air-conditioning system according to Embodiment 1 of the present invention, the difference in air temperature between the absorption and desorption processes is smaller than that in a case where there is heating means since heating is not performed during the desorption process in the dehumidifier, so that the difference between the absorption and desorption rates is reduced. Therefore, the absorption and desorption rates are close to each other, so that the potential of the absorbent can be used with high efficiency.

Furthermore, in the air-conditioning system according to Embodiment 1 of the present invention, the difference in temperature between the moisture absorbing-and-desorbing devices 23a and 23b when the air flow passages are switched during cooling and dehumidifying operation is reduced since there is no desorption heat source. In addition, since the difference from the passing-air temperature is also reduced, the thermal resistance of each of the moisture absorbing-and-desorbing devices 23a and 23b occurring due to factors associated with the difference from the temperature of the passing air is reduced, thereby allowing for highly efficient dehumidification.

Furthermore, in the air-conditioning system according to Embodiment 1 of the present invention, since the moisture absorbing-and-desorbing devices 23a and 23b are stationary within the air passages due to being fixed therein, the devices are not limited in shape for performing operation, such as rotation, as in desiccant rotors, so that the air-passage area of each of the moisture absorbing-and-desorbing devices 23a and 23b can be matched with the shape of the air passage. By ensuring a large airflow area and reducing the air speed, pressure loss can be reduced. Moreover, the contact area between air and the absorbent in each of the moisture absorbing-and-desorbing devices 23a and 23b can be increased so that the absorption and desorption amounts can be increased.

Furthermore, in the air-conditioning system according to Embodiment 1 of the present invention, since the air flows into the moisture absorbing-and-desorbing devices 23a and 23b in opposite directions between the absorption and desorption processes such that the air flowing direction is reversed between the absorption and desorption processes, the dehumidification and humidification efficiency can be increased.

Furthermore, in the air-conditioning system according to Embodiment 1 of the present invention, although the amount of air passing through the humidity control device 20 temporarily changes at the time of switching between the air flow passages A and B, the operation time of the air-flow-passage switching devices 24a and 24b can be sufficiently shortened relative to the air-passage switching cycle by, for example, increasing the rotation speed of the motor used for each of the air-flow-passage switching devices 24a and 24b, thereby allowing for switching between the air flow passages A and B without affecting the refrigeration cycle.

Furthermore, in the air-conditioning system according to Embodiment 1 of the present invention, the balance between sensible heat treatment capacity and latent heat treatment capacity can be changed while maintaining the total heat capacity constant without changing the frequency of the compressor 11 that controls the flow of the refrigerant in the refrigerant circuit or changing the opening degree of the expansion means 14, whereby air-conditioning capacity corresponding to the target temperature and humidity can be controlled without disturbing the stability of the refrigeration cycle.

Furthermore, in the air-conditioning system according to Embodiment 1 of the present invention, the latent heat treatment amount and the sensible heat treatment amount can be controlled by simply changing the switching timings of the air-flow-passage switching devices 24a and 24b as shown in FIG. 9. Thus, even when reaching the same target humidity, latent heat or sensible heat can be selected in accordance with a request from the air-conditioned space by selecting whether to prioritize dehumidification or temperature adjustment.

Embodiment

Figure 16:
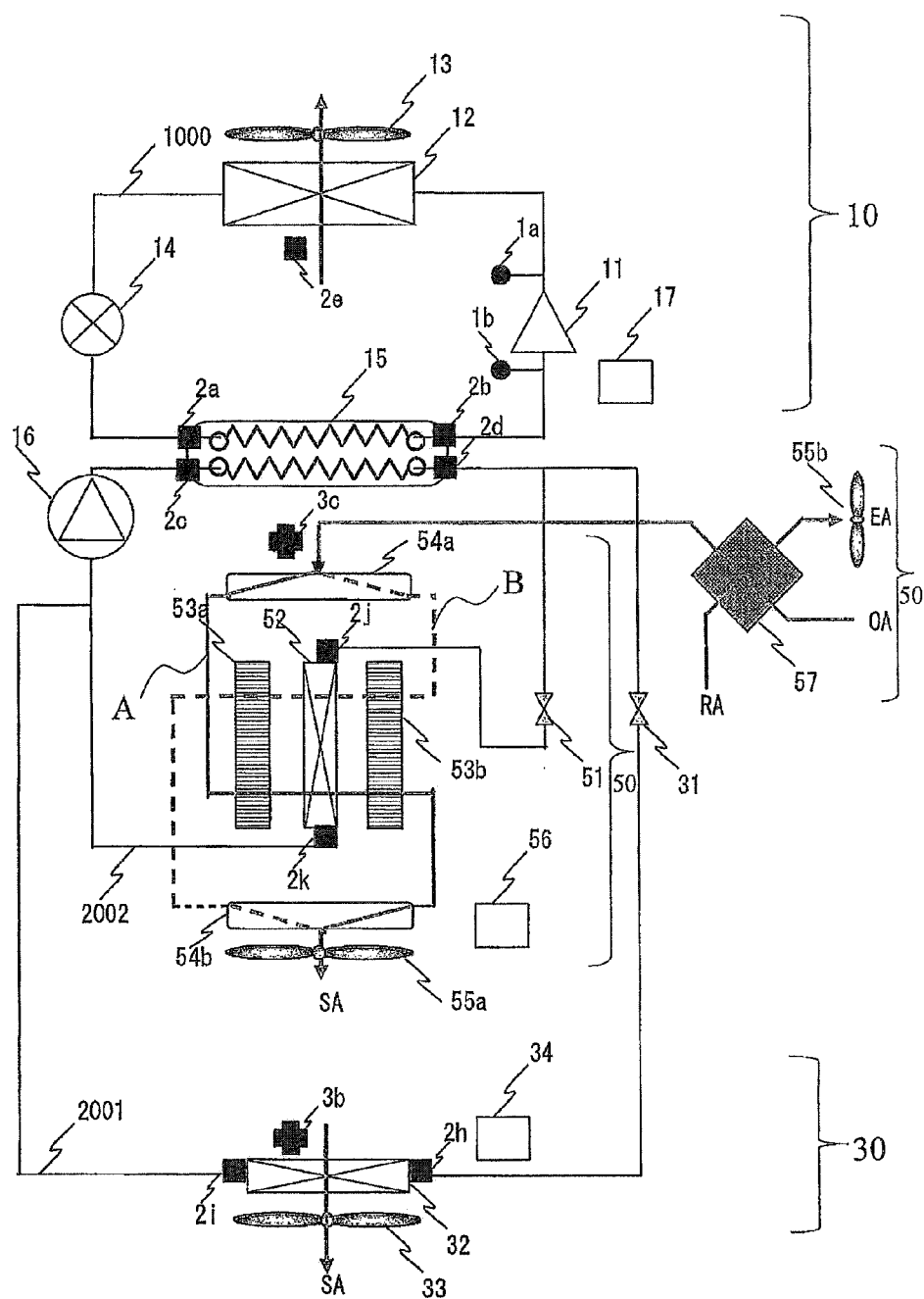
FIG. 16 is a refrigerant circuit diagram of the air-conditioning system according to Embodiment 2 of the present invention.

FIG. 16 is a refrigerant circuit diagram of an air-conditioning system according to Embodiment 2 of the present invention. In this case, an outside-air treatment device 50 corresponds to the humidity control device 20 according to Embodiment 1.

In the following, descriptions regarding, for example, the sensor arrangements on the air-flow-passage side of the humidity control device, the operation at the air circuit side, and the system control method, which are the same as those in Embodiment 1 of the present invention, will be omitted.

As shown in FIG. 16, the outdoor unit 10, the outside-air treatment device 50, and the indoor unit 30 are connected. The outside-air treatment device 50 has moisture absorbing-and-desorbing devices 53a and 53b, a third heat exchanger 52, air-flow-passage switching devices 54a and 54b, total heat exchanging means 57 that performs total heat exchange between outside air OA and return air RA and is provided upstream of the air-flow-passage switching devices 54a and 54b, air-sending means 55a and 55b, and a control substrate 56.

In the outside-air treatment device 50, the outside air OA passes through the total heat exchanging means 57 and then passes through the air-flow-passage switching device 54a. Subsequently, the outside air OA passes through either an air flow passage A, which extends through the moisture absorbing-and-desorbing device 53a, the third heat exchanger 52, and the moisture absorbing-and-desorbing device 53b in this order, or an air flow passage B, which extends through the moisture absorbing-and-desorbing device 53b, the first heat exchanger 22, and the moisture absorbing-and-desorbing device 53a, then passes through the air-flow-passage switching device 54b, and is supplied indoors as supply air SA.

In the outside-air treatment device 50, the return air RA passes through the total heat exchanging means 57 and is exhausted outdoors as exhaust air EA.

<<Advantages of Embodiment 2>>

In the air-conditioning system according to Embodiment 2 of the present invention, the total heat exchanging means 57 is installed as shown in FIG. 16 so that total heat exchange between the outside air and the indoor air is possible, and a load generated by the exhaust air is reduced, thereby allowing for reduced input of the compressor.

Furthermore, in a case where the temperature and the humidity of the outside air are higher than those of the indoor air, the temperature and the humidity of the outside air after passing through the total heat exchanging means 57 are higher than those of the indoor air.

Therefore, the difference between the temperature of the cooling fluid flowing through the third heat exchanger 52 and the temperature of the passing air increases as compared with the indoor air, so that many heat treatments can be performed, thereby allowing for a highly efficient heat treatment with respect to the heat exchanger capacity.

Furthermore, in the air-conditioning system according to Embodiment 2 of the present invention, since the outside-air treatment device 50 is not equipped with a compressor, all devices disposed above a ceiling, like the indoor unit and the outside-air treatment device, do not need to be equipped with compressors, thereby allowing for weight reduction and size reduction.

The invention claimed is:

1. A refrigeration and air-conditioning apparatus comprising:
   a compressor that compresses a refrigerant;
   a condenser that condenses the refrigerant compressed by the compressor;
   an air-sending unit that sends air toward the condenser;
   an expansion unit that reduces a pressure of the refrigerant condensed by the condenser; and
   an evaporator hat evaporates the refrigerant reduced in pressure by the expansion unit,
   wherein a refrigeration cycle is formed by a refrigerant circuit including the compressor, the condenser, the expansion unit, and the evaporator,
   the refrigeration and air-conditioning apparatus further comp
   a cooling-fluid sending unit that sends a cooling fluid to the evaporator, wherein the cooling fluid exchanges heat with the refrigerant and decreases in temperature without change in phase of the cooling fluid; and a first heat exchanger that exchanges heat between ambient air and the cooling fluid that has undergone heat exchange at the evaporator,
wherein a first cooling-fluid circuit is formed by annularly connecting the evaporator, the first heat exchanger, and the cooling-fluid sending unit by using a pipe,
the refrigeration and air-conditioning apparatus further comprising:
a first air-sending unit that sends air to the first heat exchanger;
a first moisture absorbing-desorbing device and a second moisture absorbing-and-desorbing device that are provided at a flow passage of the air sent by the first air-sending unit and that are disposed in front of and behind the first heat exchanger; and
an air-path switching device that reverses a passing direction of air passing through the first, moisture absorbing-and-desorbing device, the first heat exchanger, and the second moisture absorbing-and-desorbing device,
wherein the air-path switching device switches between a path along which the air sequentially passes through the first moisture absorbing-and-desorbing device, the first heat exchanger, and the second moisture absorbing-and-desorbing device and a path along which the air sequentially passes through the second moisture absorbing-and-desorbing device, the first heat exchanger, and the first moisture absorbing-and-desorbing device.

2. The refrigeration and air-conditioning apparatus of claim 1, further comprising:
a second cooling-fluid circuit formed by annularly connecting the evaporator, a second heat exchanger that exchanges heat between ambient air and the cooling fluid that has undergone heat exchange at the evaporator, and the cooling-fluid sending unit by using a pipe; and
a second air-sending unit that sends air to the second heat exchanger,
wherein the second heat exchanger is accommodated in an indoor unit that performs indoor air-conditioning.

3. The refrigeration and air-conditioning apparatus of claim 1, further comprising:
an outside-air treatment device that includes
an exhaust air-sending unit that sends air contained in the indoor unit outward from the indoor unit, and
a total heat exchanging unit that is provided upstream of the air-path switching device and that performs total heat exchange.

4. The refrigeration and air-conditioning apparatus of claim 1, further comprising:
a control unit that changes a switching cycle of the air-path switching device on the basis of at least a state quantity of indoor air.

5. The refrigeration and air-conditioning apparatus of claim 1, further comprising:
a control unit that sets a target temperature of the cooling fluid at an outlet of the evaporator,
wherein the control unit, in a case where an operation-start determination enthalpy calculated from a temperature and humidity set from outside falls below an enthalpy of indoor air and a latent-sensible-separation determination enthalpy calculated from the temperature and humidity set from the outside is equal to or lower than the enthalpy of the indoor air, sets the target temperature of the cooling fluid at the outlet of the evaporator as a preset initial value, and
wherein the control unit, in a case where the operation-start determination enthalpy calculated from the temperature and humidity set from the outside falls below the enthalpy of the indoor air and the latent-sensible-separation determination enthalpy calculated from the temperature and humidity set from the outside exceeds the enthalpy of the indoor air, sets the target temperature of the cooling fluid at the outlet of the evaporator to a value close to a dew-point temperature of the indoor air or to a value equal to or higher than the dew-point temperature.

6. The refrigeration and air-conditioning apparatus of claim 2, further comprising:
a control unit that changes a switching cycle of the air-path switching device,
wherein the control unit, in a case where an operation-start determination enthalpy calculated from a temperature and humidity set from outside falls below an enthalpy of indoor air, a latent-sensible-separation determination enthalpy calculated from the temperature and humidity set from the outside exceeds the enthalpy of the indoor air, and a target temperature calculated from the temperature and humidity set from the outside falls below a temperature of the indoor air, starts an operation of the indoor unit, and extends the switching cycle of the air-path switching device, and
wherein the control unit, in a case where the operation-start determination enthalpy calculated from the temperature and humidity set from the outside falls below the enthalpy of the indoor air, the latent-sensible-separation determination enthalpy calculated from the temperature and humidity set from the outside exceeds the enthalpy of the indoor air, and the target temperature calculated from the temperature and humidity set from the outside is equal to or higher than the temperature of the indoor air, stops operation of the indoor unit, and shortens the switching cycle of the air-path switching device.

* * * * *